(12) United States Patent
Jurgetz et al.

(10) Patent No.: US 6,277,917 B1
(45) Date of Patent: Aug. 21, 2001

(54) POWDER COATING COMPOSITIONS AND COATED SUBSTRATES WITH MULTILAYERED COATINGS

(75) Inventors: Anton Jurgetz, Dingolfing (DE); Karen B. Allen, Irwin, PA (US); John M. Furar, Pittsburgh, PA (US); Kurt A. Humbert, Allison Park, PA (US); Charles M. Kania, Natrona Heights, PA (US); Stephen G. McQuown, Cheswick, PA (US); Karen S. Rechenberg, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/326,921

(22) Filed: Jun. 7, 1999

Related U.S. Application Data

(62) Division of application No. 08/933,026, filed on Sep. 18, 1997, now abandoned.
(60) Provisional application No. 60/026,936, filed on Sep. 19, 1996.

(51) Int. Cl.$^7$ .................................................. C09D 133/14
(52) U.S. Cl. .................... 525/125; 525/166; 525/194; 525/377.3; 525/386; 525/934; 524/91; 524/102; 524/116; 524/117; 524/229
(58) Field of Search ........................ 525/194, 166, 525/125, 377.3, 386, 934; 524/116, 117, 229, 102, 91

(56) References Cited

U.S. PATENT DOCUMENTS

| | | | |
|---|---|---|---|
| 3,959,405 | 5/1976 | Labana et al. | 260/836 |
| 4,027,066 | 5/1977 | Victorius | 428/334 |
| 4,042,645 | 8/1977 | Hirota et al. | 260/830 P |
| 4,069,275 | 1/1978 | Labana et al. | 260/836 |
| 4,091,049 | 5/1978 | Labana et al. | 260/836 |
| 4,147,679 | 4/1979 | Scriven et al. | 260/29.2 TN |
| 4,246,368 | 1/1981 | Maurase et al. | 525/117 |
| 4,248,744 | 2/1981 | Masar et al. | 260/17.456 |
| 4,346,144 | 8/1982 | Craven | 428/335 |
| 4,403,003 | 9/1983 | Backhouse | 427/407.1 |
| 4,539,363 | 9/1985 | Backhouse | 524/460 |
| 4,650,718 | 3/1987 | Simpson et al. | 428/413 |
| 4,675,358 | 6/1987 | Frangou | 524/439 |
| 4,681,811 | 7/1987 | Simpson et al. | 428/413 |
| 4,689,131 | 8/1987 | Roue et al. | 204/181.7 |
| 4,703,101 | 10/1987 | Singer et al. | 528/87 |
| 4,753,998 | 6/1988 | Hayes et al. | 525/275 |
| 4,804,581 | 2/1989 | Geary et al. | 428/332 |
| 4,818,791 | 4/1989 | Murakami et al. | 525/124 |
| 4,851,460 | 7/1989 | Stranghoner et al. | 423/407 |
| 4,914,148 | 4/1990 | Hille et al. | 524/507 |
| 4,988,767 | 1/1991 | Pettit, Jr. | 525/194 |
| 5,034,432 | 7/1991 | Ueno et al. | 523/221 |
| 5,071,904 | 12/1991 | Martin et al. | 524/458 |
| 5,198,490 | 3/1993 | Berg et al. | 524/443 |
| 5,202,382 | 4/1993 | Pettit, Jr. | 525/108 |
| 5,212,245 | 5/1993 | Franks et al. | 525/223 |
| 5,219,939 | 6/1993 | Wamprecht et al. | 525/117 |
| 5,270,391 | 12/1993 | Miyazaki et al. | 525/194 |
| 5,290,845 | 3/1994 | Berg et al. | 524/443 |
| 5,337,184 | 8/1994 | Helms et al. | 359/270 |
| 5,370,910 | 12/1994 | Hille et al. | 427/407.1 |
| 5,384,358 | 1/1995 | Wamprecht et al. | 525/28 |
| 5,407,706 | 4/1995 | Kano et al. | 427/386 |
| 5,407,707 | 8/1995 | Simeone et al. | 427/410 |
| 5,412,023 | 5/1995 | Hille et al. | 524/539 |
| 5,492,955 | 2/1996 | Wamprecht et al. | 525/375 |
| 5,494,977 | 2/1996 | Harano et al. | 525/438 |
| 5,510,428 | 4/1996 | Harano et al. | 525/438 |
| 5,512,322 | 4/1996 | Hille et al. | 427/407.1 |
| 5,521,250 | 5/1996 | Wamprecht et al. | 525/130 |
| 5,547,758 | 8/1996 | Watanabe et al. | 428/413 |

FOREIGN PATENT DOCUMENTS

| | | |
|---|---|---|
| 2049837 | 3/1992 | (CA) . |
| 2064292 | 10/1992 | (CA) . |
| 4032391 | 4/1992 | (DE) . |
| 19534432 | 3/1997 | (DE) . |
| 0 509 392 | 10/1992 | (EP) . |
| 0 522 648 | 1/1993 | (EP) . |
| 0 544 206 | 6/1993 | (EP) . |
| 0602497 | 6/1994 | (EP) . |
| 0 652 265 | 5/1995 | (EP) . |
| 0 773 267 | 5/1997 | (EP) . |
| 0 773 268 | 5/1997 | (EP) . |
| 52-69936 | 6/1977 | (JP) . |
| 61-252276 | 11/1986 | (JP) . |
| 3-126777 | 5/1991 | (JP) . |
| WO98/12268 | 3/1998 | (WO) . |

OTHER PUBLICATIONS

Principles of polymer Chemistry (1953), Cornell University Press pp. 52–57.

*Primary Examiner*—Patricia A. Short
(74) *Attorney, Agent, or Firm*—Deborah M. Altman

(57) ABSTRACT

Curable powder clear coating composition and coated substrate with multilayered coatings have as the predominant film-forming polymer in the coating at least one epoxy acrylic copolymer in an amount from 60 to 99.99 percent by weight and 10 to 40 percent by weight of a polycarboxylic acid crosslinking agent. The percentages by weight are based on solids of the curable coating composition. A single predominant film-forming epoxy acrylic copolymer has a number average molecular weight in the range of about 1000 to 5500; a calculated Tg in the range of 50 to 85° C.; epoxy content in the range of 35 to 85, and a styrene content resulting from an amount of styrene monomer in the range of up to about 25 weight percent based on the weight percent of the monomers to form the copolymer. The blend of epoxy acrylic copolymer has one polymer which is the single epoxy acrylic copolymer or one having a number average molecular weight in the range of about 1000 to about 10,000, a calculated Tg in the range of about 40° C. to 85° C., and an epoxy content from 40 to 60 weight percent of the total weight of the monomers to prepare the epoxy acrylic copolymer. The other polymer of the blend has a number average molecular weight in the range of about 500 to about 3000, a calculated Tg in the range of about 35° C. to about 125° C., and an epoxy content from glycidyl functional ethylenically unsaturated monomer that is higher than that of the first epoxy functional acrylic copolymer of the blend and in the range of about 50 to about 100.

23 Claims, No Drawings

POWDER COATING COMPOSITIONS AND COATED SUBSTRATES WITH MULTILAYERED COATINGS

This is a divisional of U.S. patent application Ser. No. 08/933,026, filed Sep. 18, 1997 now abandoned, which claims the benefits of U.S. Provisional Application No. 60/026,936, filed Sep. 19, 1996.

FIELD OF THE INVENTION

The present invention relates to curable thermosetting powder coating compositions for clear coats of a multilayered coating composite on substrates. The composite has at least a base coat layer with a clear coat layer over the base coat layer. Additionally, the composite can have a primer coating layer beneath the base coat layer. Such powder clear coat layers and multilayer coating composites are useful in painting motor vehicles.

Solid particulate coating formulations referred to in the industry as "powder coatings" are finding increasing use in painting metal substrates both as primer coatings and as top or clear coats of the base coat and clear coat composite coatings. The automotive industry provides corrosion protection and decorative appearance for motor vehicles by multilayered paint composites on the various types of surfaces of motor vehicles. The finishing layers of this composite usually include the popular base coat clear coat composites. The base coat is a pigmented layer and the clear coat is a nonpigmented or only slightly pigmented layer that is applied separately to the base coat and cured to some degree with the base coat. To provide improved coating composites for motor vehicles, the industry is seeking solutions to the problem of abrasive chipping of the paint from the action of road dirt and debris, like sand and gravel, that may strike areas of the vehicle such as the hood and lower portions of the vehicle such as rocker panels. These strikes can be with considerable impact velocity to result in unaesthetic chipping of the clear coat which can expose one or more underlying layers of the multilayered coating composite, which can also contribute to rusting.

Chipping in a multilayered coating composite can involve several failure mechanisms such as adhesive failure between layers of the multilayered composite or cohesive failure within a layer. To obtain good protection against chipping damage, the main underlying layers of the multilayered composite should have good intercoat or interlayer adhesion. Typically, clear coats which are generally the outermost layer of the multilayered coating composite typically assist in providing the properties of good appearance and environmental protection from etch, scratch and UV degradation along with good intercoat adhesion with the base coat.

The powder clear coats are becoming more widely used for their advantages in application from their lower organic solvent emissions. These coatings typically have very low levels of volatile solvents, i.e., on the order of two percent or slightly higher but generally much less than other paint systems. Generally, powder coating manufacturers have focused on the appearance, protection, and processability features of powder coatings to extract the environmental benefits of these coatings rather than any contribution of these coatings to chip resistance of the multilayered coating composite.

For instance, U.S. Pat. Nos. 5,270,391 and 5,407,706 show thermosetting curable powder coatings having epoxy functional acrylic copolymers in blends where the powders have good storage stability and give coatings with good appearance properties. The resin blends are of either a high softening point glycidyl-containing acrylic with a low softening point glycidyl-containing acrylic, or of different viscosities.

It is an object of the present invention to provide a clear coating composition which contributes to improved chip resistance of the multilayered coating composite of which the clear coat is a part without a detrimental effect on the appearance properties of the coating. Another object of the present invention is to provide improved stability of the powder and outstanding durability of the clear coat.

SUMMARY OF THE INVENTION

In accordance with the present invention, a curable thermosetting powder clear coating composition is provided for a clear coat of a base coat and clear coat composite coating with improved chip resistance. This is accomplished by the curable clear coating composition having: I) as the predominant film-forming polymer of the powder coating at least one epoxy functional acrylic polymer or copolymer (hereinafter referred to as "epoxy acrylic polymer"), and (II) polycarboxylic acid crosslinking agent where the ratio of epoxy functionality of (I) to acid functionality of (II) is about 1:0.6 to 1.4. Generally, the amount of the at least one particulate film-forming epoxy acrylic polymer is from about 60 to about 99.99 percent by weight based on the solids of the curable clear powder coating composition. Generally, the amount of the polycarboxylic acid crosslinking agent is in the range of about 10 to about 40 weight percent based on the weight of solids of the curable clear powder coating composition.

When a single epoxy acrylic polymer is the predominant film-forming polymer, the polymer has a number average molecular weight ("Mn") range, a range of glass transition temperature (Tg), and a range of epoxy content all as shown in Table A below. When a blend of more than one epoxy acrylic polymer is the predominant film-forming polymer of the curable clear coating composition, two of the epoxy acrylic polymers in the blend have the Mn, Tg, and epoxy content of one and the other epoxy acrylic polymers are as shown in Table A as "A" and "B".

TABLE A

| | Mn (grams) | Tg ° C. | Epoxy Content[2] |
|---|---|---|---|
| Single Epoxy Acrylic Polymer | about 1000 to about 5500 | about 30 to about 60° C. as measured or 50 to 85° C.[1] | 35 to 85 |
| Blend of Epoxy Acrylic Polymers | A) about 1000 to about 10,000 | about 40 to about 85[1] | 40–60 |
| | B) about 500 to about 3000 | about 35 to about 125[1] | 50–100 |

[1]As calculated by the Acrylic Glass Transition Temperature Analyzer from Rohm and Haas Company which is based on the Fox equation.
[2](GMA) As weight percent of the monomers to prepare the epoxy acrylic polymer.

In the blend, two epoxy acrylic polymers have relatively low molecular weights and one polymer has a higher epoxy content within the higher range shown in Table A. If the epoxy acrylic polymer B of Table A has the epoxy content of 50 weight percent, the epoxy acrylic polymer A has a lower epoxy content within the range of 40 to almost 50. Also, when the higher epoxy content epoxy acrylic polymer has an epoxy content from 50 to 60, the epoxy content of the lower epoxy content epoxy acrylic polymer is in the range from 40 up to almost the value of epoxy content for the higher epoxy content epoxy acrylic polymer. Of course, with the epoxy content of greater than 60 for the higher epoxy content epoxy acrylic polymer, the epoxy content for the lower epoxy content epoxy acrylic polymer is in the range of from about 40 to 60. Also, the higher epoxy content epoxy acrylic polymer usually has the lower molecular weight between the two polymers "A" and "B" in the blend. Generally, the ratio of the low epoxy content polymer to the higher epoxy content polymer is in the range of 90:10 to 10:90.

The one or more epoxy acrylic polymers typically are formed by addition polymerization under free radical initiated conditions from at least the following: (i) about 20 to about 100 percent by weight of the total monomers of a glycidyl functional copolymerizable ethylenically unsaturated monomer; and (ii) up to about 65 percent by weight of one or more copolymerizable ethylenically unsaturated monomer or mixture of monomers. The exact amount of each monomer (i) and (ii) depends on the desired epoxy content for the epoxy acrylic polymer and on whether one or a blend of the epoxy acrylic polymers is used as the predominant film-forming polymer for the powder coating composition. With a single polymer the particular amounts of (i) and (ii) are from about 35 to about 85 percent by weight of (i) and about 15 to 65 percent by weight of (ii) monomers. The monomers of (ii) that are free of glycidyl functionality are of a type and in an effective amount with the other monomers to yield the desired Tg for the epoxy acrylic polymer. The percents by weight for the monomers of (i) and (ii) are based on the total weight of (i) and (ii) monomers for each polymer of the blend. As with the single epoxy acrylic polymer, the epoxy acrylic polymers of the blend have amounts of (i) and (ii) that vary according to the desired values of the parameters of Table A for each of the polymers of the blend.

Also, the epoxy acrylic polymer as a single epoxy acrylic polymer or in the blend can have the addition type of polymerization residue of styrene. For the single epoxy acrylic polymer, this can be resulting from an amount of styrene monomer in one or more of the (ii) monomers of up 25 weight percent of the total monomers used to prepare the epoxy acrylic polymer. For the epoxy acrylic polymers in the blend, the amount of styrene can be that resulting from an amount of styrene monomer in one or more of the (ii) monomers of up to about 39 weight percent of the total monomers used to prepare the epoxy acrylic polymers of the blend. In the blend, the polymer with the lower epoxy content generally has less than 25 weight percent of such a polymerization residue from styrene based on the total monomers used to prepare that epoxy acrylic polymer.

Another aspect of the invention is a multilayered coating composite on a substrate which includes a primer layer, base coat layer and powder clear coat layer, where the latter has as a film-forming polymer of at least one low molecular weight epoxy acrylic polymer. This epoxy acrylic polymer or blend of epoxy acrylic polymers has the Mn, Tg, and epoxy content as shown in the aforementioned ranges of Table A. The multilayered coating composite on substrates like those with electrodeposited primer coatings over prepared metallic surfaces has improved adhesion between the base coat and the adjacent primer layer.

DETAILED DESCRIPTION OF THE INVENTION

In the following discussion, unless explicitly stated otherwise, the ranges of amounts, molecular weights, ratios, temperatures, time, and reaction conditions and the like usually can be varied to a degree from about the lower stated number to about the higher stated number of each specific range. By the term "film-forming", it is meant that 1) the particulate polymeric material of a powder coating upon melting and curing at elevated temperature or 2) the polymeric material dispersed or solubilized in a solvent or carrier upon drying or evaporation of the solvent or carrier and curing of the polymeric material forms a self-supporting continuous film on at least a horizontal surface. Also by the term "powder", it is meant a particulate, finely divided solid polymeric material generally having a particle size of 0.005 to 100 microns. The terms "epoxy content" refer to a determination through the determination of epoxide equivalent weight in non-aqueous resins and their solutions by differential titration with perchloric acid using crystal violet as an indicator. An epoxy-containing sample is dissolved in glacial acetic acid and titrated against a standard solution of (0.1N) perchloric acid in glacial acetic acid in the presence of tetraethylammonium bromide, using crystal violet as indicator. This potentiometric titration with perchloric acid determines the base content of the polyepoxide. The mass in grams of sample containing one mole of unreacted epoxide functionality is determined by reaction of the epoxide with hydrobromic acid. The hydrobromic acid is generated in situ by the reaction of tetraethylammonium bromide with perchloric acid. A second sample of the polyepoxide is mixed with excess tetraethylammonium bromide and titrated with 0.1N perchloric acid to a green endpoint that persists for at least 30 seconds, and total epoxide and amine equivalents are calculated from these titrations, and the epoxide equivalent weight is calculated as the difference. The epoxy content is the epoxy equivalent weight divided by the molecular weight of the polyepoxide sample.

For the film-forming polymeric epoxy acrylic polymer for the predominant film-forming polymer of the curable powder coating, whether as the single polymer or the blend, the Tg's of Table A can generally be calculated by any method known to those skilled in the art. The Tg of the copolymer contributes to the stability of the powder coating composition. Generally, the higher the Tg of the polymer, the better the stability of the coating. The Tg is described in PRINCIPLES OF POLYMER CHEMISTRY (1953), Cornell University Press. The Tg can actually be measured or it can be calculated as described by Fox in *Bull. Amer. Physics Soc.*, 1, 3 page 123 (1956). The Tg of the high Tg monomers mentioned herein refers to the calculated value of the homopolymer made from the monomer calculated as described above by Fox. For example, the Tg of methylmethacrylate monomer is 221° F. (105° C.) and that of styrene monomer is 212° F. (100° C.). The Tg of the copolymer from these monomers and the glycidyl-containing monomer in appropriate amounts is typically between 30° C. and 60° C., and more preferably between 35° C. and 55° C. The actual measured values for Tg are obtainable by differential scanning calorimetry (DSC) usually at a rate of heating of 18° F. (10° C.) per minute, where the Tg is taken at the first inflection point. Also, the Tg can be measured experimentally by using a penetrometer such as a DuPont 940 Thermomedian Analyzer or comparable equipment from Perkin-Elmer Corporation. The Tg of the polymers as used herein for this invention refers to the calculated values in accordance with the Fox equation as part of the tables of the "Acrylic Glass Transition Temperature Analyzer" from Rohm and Haas Company, unless otherwise indicated.

The epoxy acrylic polymer can be prepared by copolymerizing a glycidyl functional ethylenically unsaturated monomer (i), typically a glycidyl functional acrylic monomer, such as glycidyl acrylate or glycidyl methacrylate ("glycidyl (meth)acrylate"), with (ii) an ethylenically unsaturated monomer or mixture of monomers free of glycidyl functionality. Preferably in the practice of the invention where the polymer is the single main film-forming polymer of the coating composition, the glycidyl functional monomer (i) can be copolymerized with one or more (ii) monomers having a Tg greater than 200° F. (93° C.). Preferably, the measured Tg for the single epoxy acrylic polymer is 30° C. to 60° C. The high Tg monomer can assist in preventing caking and instability problems associated with powder coatings. Suitable monomers free of glycidyl functionality include methylmethacrylate and methacrylic acid ester or acrylic acid ester ("(meth)acrylic acid ester") having an alicyclic hydrocarbon group having 5 to 22 carbon atoms, more suitably 5 to 10 carbon atoms in the ester portion. Suitable examples include: cyclopentyl methacrylate, cyclohexyl methacrylate, methylcyclohexyl-methacrylate, trimethylcyclohexyl methacrylate, norbornylmethacrylate, norbornylmethyl methacrylate, isobornyl methacrylate and the like. The amount of styrene on a weight percent basis of the total monomers for the single type epoxy acrylic polymer is preferably up to about 20 weight percent of the total monomers. When styrene is absent from the epoxy copolymer, it is preferred to have at least one of the aforementioned high Tg ethylenically unsaturated monomers as monomers to prepare the epoxy acrylic polymer. Also, other ethylenically unsaturated monomers can be used in the preparation of the one or more epoxy acrylic polymers such as hydroxyalkylacrylates and hydroxyalkylmethacrylates such as hydroxypropylacrylate, hydroxypropylmethacrylate, and hydroxybutylacrylate.

The epoxy acrylic polymer can be prepared by traditional free radical initiated polymerization techniques using suitable catalysts which include organic peroxides and azo-type compounds and chain transfer agents such as alpha-methyl styrene dimer and tertiary dodecyl mercaptan. The preparation of the epoxy copolymer as an epoxy-containing acrylic polymer may be conducted as disclosed in U.S. Pat. No. 4,650,718 (column 1, line 61 through column 3, line 40 and column 4, line 55 through column 9, line 15), incorporated herein by reference. The preparation of the epoxy acrylic polymer utilized as the single copolymer for the main film-forming polymer of the powder composition usually has amounts of the (i) and (ii) monomers in the following ranges. Preferably, this polymer has: (i) 35 to 65 percent by weight of the glycidyl functional monomer and (ii) 35 to 65 percent by weight of one or more copolymerizable ethylenically unsaturated monomers free of glycidyl functionality. Most preferably, the (ii) monomer is methylmethacrylate or trimethylcyclohexyl methacrylate. In addition to the (i) and (ii) monomers, the epoxy acrylic polymer can also have from 5 to 20 percent by weight, based on weight of the total monomers for the polymer, of one or more additional copolymerizable monomers different from the (i) and (ii) monomers, like butylmethacrylate. Although other ethylenically unsaturated monomers can be present in the epoxy acrylic polymer, the percentages by weight of the aforementioned monomers including any styrene preferably are based on the total weight of (i), and (ii) monomers, to achieve a total of 100 percent.

In addition to the aforementioned Mn, the single type of epoxy acrylic polymer preferably has a weight average molecular weight typically between about 1000 and 5500 and most preferably about 2000 to about 4000 and a peak molecular weight in the range of 2000 to 5500. Also, the single type of epoxy acrylic polymer preferably has the aforelisted epoxy content so that there is from 3.0 to 5.9 moles of glycidyl functional ethylenically unsaturated monomer per kilogram of epoxy functional copolymer, more suitably between 3.5 and 5.1 moles of glycidyl functional monomer per kilogram of epoxy copolymer.

When the predominant film-forming polymer of the powder coating is a blend of the epoxy acrylic polymers, as is preferred, the lower epoxy content polymer can have a peak molecular weight in the range of 4500 to 8000 and a measured Tg of 40° C. to 60° C. The higher epoxy content polymer can have a peak molecular weight of 2000 to 4500 and a measured Tg in the range of 40° C. to 60° C. The blend preferably has a range from around 25 to 75 to 75 to 25 of the two aforementioned epoxy acrylic polymers where the preferred molecular weight range, Tg range, epoxy equivalent weight and epoxy content are as shown in Table B.

TABLE B

| Mn (grams) | Tg ° C. | Epoxy Equivalent Weight | Epoxy Content |
| --- | --- | --- | --- |
| A) 1000 to 3000 | 50 to 85 (calculated) 30 to 60 (measured) | 240–350 | 50 |
| B) 800 to 2000 | 35 to 120 (calculated) about 0 to about 40 | 142–285 | 90 |

The epoxy acrylic polymers for the blend are preferably two epoxy copolymers that are prepared in a similar manner as the single epoxy acrylic polymer. The blend has a total styrene content for the two or more epoxy acrylic polymers, based on the weight of the total epoxy acrylic polymers, of from 0 up to about 39 weight percent taking into consideration both epoxy acrylic polymers. This means that one of the epoxy acrylic polymers in the blend may have a styrene content greater than these ranges, but when considering the lower styrene content of the other epoxy acrylic polymer in the blend and the ratios of each epoxy acrylic polymer in the blend, the blend preferably does not have a styrene content greater than the aforementioned range. The amounts of the (i) and (ii) monomers for one of the epoxy acrylic polymers in the blend are preferably the same as those for the single type of epoxy acrylic polymer. While the other epoxy acrylic polymer in the blend has amounts of the (i) and (ii) monomers preferably in the range to result in the higher epoxy content and the preferred Tg and molecular weight as aforelisted in Table B.

The polyacid crosslinking agent in the film-forming resinous material is in amounts of about 10 to 90, preferably 25 to 75 percent by weight based on total weight of resin solids in the powder coating composition. The polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid crosslinking agents in which difunctional curing agents are mixed with tri- or higher functionality polyacid crosslinking agents. Polyacid crosslinking agent mixtures including up to about 50 percent of a difunctional curing agent with a trifunctional curing agent are suitable. Higher percentages of difunctional materials can be used if the remainder of the curing agent mixture is higher than trifunctional or if the polyacid crosslinking agent mixture is used with a highly functional polyepoxide component. The acid functionality is preferably carboxylic acid, although acids such as phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. No. 4,650,718 to Simpson et al. (column 1, line 61 through column 3, line 40 and column 4, line 55 through column 9, line 15); U.S. Pat. No. 4,681,811 to Simpson et al. (column 1, line 63 through column 10, line 65); U.S. Pat. No. 4,703,101 to Singer et al. (column 3, line 26 to column 6, line 5); U.S. Pat. No. 4,804,581 to Pettit et al. (column 5, line 12 through column 7, line 34); and U.S. Pat. No. 5,407,707 to Simeone et al. (column 3, line 50 through column 4, line 10), which are hereby incorporated by reference.

Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol and the like. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides, and polyols may also be used.

The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent allowing for improved flow and appearance.

The powder coating composition is prepared by combining approximately 60 to 90 percent by weight of the epoxy copolymer with about 10 to 40 percent by weight, based on total weight of the powder coating of a polycarboxylic acid crosslinking agent. When the epoxy copolymer is in an amount in the lower portion of the aforementioned range, minor amounts of other film-forming polymers known to those skilled in the art to be useful in powder coating can be used.

Typically, a suitable range of epoxy copolymer to polycarboxylic acid crosslinking agent can be between 70 to 85, more preferably 70 to 80 percent by weight epoxy copolymer and between 15 to 30, more preferably 20 to 30 percent by weight polycarboxylic acid crosslinking agent, based on total weight of the powder coating. Also, it is preferred that the equivalent ratio of the reactants present in the powder composition of the present invention is adjusted such that for each equivalent of epoxy there are around 0.3 to around 3.0, preferably 0.75 to 1.5 equivalents of carboxyl (anhydride, if present, is considered monofunctional).

The powder coating composition may also contain additional materials as known to those skilled in the art. For example, an anhydride for improved cure response and copolymer of an alpha olefin and olefinically unsaturated anhydride for improved humidity resistance of the cured coating can be used.

Additionally, polymer or copolymer flow control or flow modifying agents known to those skilled in the art can be used in the powder coating of the present invention. Suitable examples and amounts are shown in U.S. Pat. No. 5,212,245 (columns 2–4). Also, commercially available flow control polymers and copolymers can be used such as Modaflow (or Resiflow) flow additives, available from Monsanto Chemical Company of St. Louis, Mo. and the like. Generally, the weight average molecular weight of the copolymer flow control agents can range from about 1000 to 40,000, preferably 1000 to 15,000. Generally, the glass transition temperature (Tg) of the copolymer is less than 10° C. and preferably less than 0° C. and most preferably in the range of −60° C. to −10° C. The Tg can be calculated and measured in the aforedescribed manner. The Tg of the copolymer is not limiting of its performance as a flow additive but Tg's greater than 10° C. are not preferred because of decreased flow on coating application. A suitable amount of the flow control agent can be in the range of from about 0.01 to about 10 percent by weight based on total resin solids for the curable powder composition. With the preferred powder coating, the weight percent is of the total resins of the particulate film-forming polymer and flow modifier. Preferably, the flow control copolymer will be included in the powder coating composition in amounts of 0.1 to 3 percent by weight, more preferably from about 0.5 to about 2 percent by weight for clear coat applications. The preferred flow modifier is that from Troy as shown in the examples.

The thermosetting powder coating compositions of the invention can optionally include other materials such as pigments, fillers, light stabilizers and antioxidants such as those shown in U.S. Pat. No. 5,407,707, hereby incorporated by reference. Nonexclusive examples of light stabilizers include those shown in the Examples herein and others such as CGL 1545 hydroxyphenyl triazine ultraviolet absorber available from Ciba-Geigy Limited, Basel, Switzerland.

Although the powder coating composition is preferably a clear coat for a base coat and clear coat composite, one or more pigments can be included in the coating composition. Their amounts would range from 1 to 50 percent by weight based on total weight of the composition if color is desired for the resultant coating. Suitable pigments include, for example, titanium dioxide, ultramarine blue, phthalocyanine blue, phthalocyanine green, carbon black, graphite fibrils, black iron oxide, chromium green oxide, ferride yellow and quindo red.

Anti-popping agents can be added to the composition to allow any volatile material to escape from the film during baking. Benzoin is a commonly preferred anti-popping agent useful in effective amount to retard popping of the coating. When used benzoin is generally present in amounts of from about 0.5 to 3.0 percent by weight based on total weight of the powder coating composition.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The thermosetting powder coating compositions are prepared by melt blending the ingredients. This can be accomplished by first blending the ingredients in a high shear mixer such as a planetary mixture, and then melt blending in an extruder from about 80° C. to about 130° C. The extrudate is then cooled and pulverized into a particulate blend. Such a particulate mixture can be applied preferably by spraying techniques. The thermosetting powder coating compositions of the invention can be applied as clearcoats in color-plus-clear or basecoat, clearcoat composite coatings.

The powder coating composition and preferably the particulate thermosetting powder coating composition can be applied directly to a substrate of, for example, metal such as steel or aluminum. Most preferably, the powder coating is a clearcoat for application over or with any basecoat formulations known to those skilled in the art such as water-borne basecoats.

The film-forming composition of the base coat in the color-plus-clear system can be any of the compositions useful in coatings applications, particularly automotive applications. The film-forming composition of the base coat comprises a film-forming resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003; EP 0038127; EP 0206615; EP 0502934; EP 0260447; EP 0281936; EP 0228003; and EP 0355433 and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Additional examples of such base coats include those solvent-borne and water-borne film-forming resinous materials that include one or more pigments such as those available from PPG Industries, Inc., Pittsburgh, Pa., U.S.A.

The base coat contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) and most preferably 5 to 30 microns in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition, yet insufficient to fully cure the basecoat. Suitable drying conditions will depend on the particular base coat composition and on the ambient humidity with certain waterborne compositions, but in general a drying time of from about 1 to 15 minutes at a temperature of about 80–250° F. (20–121° C.) is adequate. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed, that is, exposed to ambient conditions for about 1 to 20 minutes.

Application of the powder coating of the present invention can be by spraying, and in the case of a metal substrate, by electrostatic spraying which is preferred, or by the use of a fluidized bed. The powder coating powder can be applied in a single sweep or in several passes to provide a film having a thickness after cure of from 1 to 15, preferably 1 to 6 mils (25.4 to 381 usually 25.4 to 152 microns). After application of the coating composition such as the preferred powder coating, the powder coating substrate is baked at a temperature sufficient to cure the coating, typically at about 250° F. to about 400° F. (121° C. to 204° C.) for about 1 to 60 minutes, and preferably at about 275° F. to 350° F. (135° C. to 177° C.) for about 10 to 30 minutes.

While the powder coating composition can be applied directly upon bare metal, that is, upon untreated, unprimed steel or upon pretreated, i.e., phosphatized unprimed steel, in one embodiment of the invention the powder coating composition is applied to a metal substrate having a thin layer of electrodeposited primer coating. The electrodeposited primer coating upon the metal substrate can be, for example, a cathodic electrodeposition primer composition such as those available from PPG Industries, Inc. under the UNIPRIME trademark. In one aspect of the present invention, it is contemplated that the powder coating composition can be applied directly upon at least a portion of an uncured electrodeposited primer coating, for example, the electrodeposited primer coating deposited over an automotive or truck body and thereafter both the electrodeposited primer coating and powder coating as a primer coating can be co-cured by heating at a temperature between 275° F. to 350° F. (135° C. to 177° C.) for about 10 to 30 minutes.

As another aspect of the present invention, the aforementioned powder coating with the epoxy acrylic polymer as a single predominant film-forming polymer or as the blend of epoxy acrylic polymers is the clear unpigmented, or only slightly pigmented without interfering pigments, clear coat in a multilayered coating composite on substrates like those mentioned above. The multilayered coating composite can have one or more primer coats which can be any primer coating known to those skilled in the art and a basecoat for a basecoat plus clearcoat composite. For instance, the primer coat can be an electrodeposited primer coat of a cationic epoxy amine adduct cured with a polyisocyanate curing agent alone or with solvent-borne primers. The basecoat can be any known to those skilled in the art like those noted above. In addition to the at least one epoxy acrylic polymer for the powder clear coat, other acrylic polymers and copolymers can be used as long as their Mn or weight average ("Mw") molecular weight is in a range similar to the aforementioned and hereinafter mentioned ranges for the epoxy acrylic polymer. This use is as the predominant film-forming polymer as the aforedescribed epoxy acrylic polymer for the powder clear coat. These acrylic polymers and copolymers can have other functional groups with abstractable hydrogen such as hydroxyl, carboxyl, and amino and suitable noninterfering mixtures thereof.

EXAMPLES

The following examples show the preparation of powder coating compositions and polymers utilized in the thermosetting powder coating compositions of the present invention. All of the amounts are in parts by weight as grams of the actual component used in preparing the powder coating formulation.

Polymer Synthesis Examples

Examples A through I show the preparation of various polymer compositions, differing in styrene content, Tg (high and low) and molecular weight (Mw), which were used to prepare powder coating compositions of the present invention shown below in Examples 1 through 12.

Examples A–I

The ingredients of Examples A through I are listed below in Table I. The polymers of each example were prepared using the following procedure.

An initial solvent portion was charged into a four-neck flask, which served as the reaction vessel, and which was equipped with a thermocouple, a reflux condenser and a stirrer. The initial solvent charge was heated to reflux under a nitrogen gas blanket. A "first initiator mixture" is prepared in a separate premix flask. Also, the monomer mixture is prepared in a separate second premix flask. The first initiator mixture and the monomer mixture are simultaneously added dropwise from separate addition funnels into the reaction vessel over a period of time of 3 hours while maintaining the reaction at reflux and under a nitrogen gas blanket. After the completion of the additions, the reaction mixture was held at reflux for 30 minutes. After this period of time, a "second initiator mixture", which is premixed, was added by the addition funnel to the reaction vessel and the reaction was then held at reflux under the nitrogen blanket for one hour. After this period of time, a "third initiator mixture", which was premixed, is added by the addition funnel to the reaction vessel and the reaction was then held at reflux under the nitrogen blanket for one hour after which the reaction mixture was cooled. The reaction mixture was then vacuum stripped to remove volatile components. The reaction mixture was analyzed for solids content, and weight average molecular weight as determined by gel permeation chromatography using a polystyrene standard.

TABLE I

| Ingredients | A | B | C | D | E | F | G | H | I |
|---|---|---|---|---|---|---|---|---|---|
| Initial Charge: | | | | | | | | | |
| Xylene | 502.2 | 500.3 | 500.3 | 0 | 0 | 1093.5 | 1447.8 | 482.6 | 482.6 |
| Butyl acetate | 0 | 0 | 0 | 1093.5 | 1093.5 | 0 | 0 | 0 | 0 |
| Monomer Mixture: | | | | | | | | | |
| Glycidyl methacrylate | 1050 | 1045.7 | 1045.7 | 2300 | 2300 | 2300 | 3632.4 | 1210.8 | 1210.8 |
| Butyl methacrylate | 105 | 209.1 | 104.6 | 460 | 460 | 460 | 0 | 0 | 0 |
| Methyl methacrylate | 630 | 732.0 | 732.0 | 1610 | 1610 | 1610 | 0 | 0 | 0 |
| Styrene | 315 | 104.6 | 209.1 | 230 | 230 | 230 | 0 | 0 | 201.8 |
| Butyl acrylate | 0 | 0 | 0 | 0 | 0 | 0 | 0 | 0 | 201.8 |
| Trimethylcyclohexyl methacrylate | 0 | 0 | 0 | 0 | 0 | 0 | 2421.6 | 807.2 | 403.6 |
| First Initiator Mixture: | | | | | | | | | |
| Xylene | 360 | 359.1 | 359.1 | 0 | 0 | 790.1 | 1039.2 | 346.4 | 346.4 |
| Butyl acetate | 0 | 0 | 0 | 790.1 | 790.1 | 0 | 0 | 0 | 0 |
| Lupersol 555[1] | 181 | 209.1 | 209.1 | 460 | 230 | 613.3 | 0 | 0 | 0 |
| Vazo-67[2] | 0 | 0 | 0 | 0 | 0 | 0 | 302.4 | 100.8 | 100.8 |
| Second Initiator Mixture: | | | | | | | | | |
| Xylene | 18.9 | 18.7 | 18.7 | 0 | 0 | 40.7 | 54 | 18 | 18 |
| Butyl acetate | 0 | 0 | 0 | 40.7 | 40.7 | 0 | 0 | 0 | 0 |
| Lupersol 555 | 14.5 | 14.0 | 14.0 | 30.7 | 30.7 | 30.7 | 0 | 0 | 0 |
| Vazo-67 | 0 | 0 | 0 | 0 | 0 | 0 | 24.6 | 8.2 | 8.2 |
| Third Initiator | | | | | | | | | |

TABLE I-continued

| Ingredients | A | B | C | D | E | F | G | H | I |
|---|---|---|---|---|---|---|---|---|---|
| Mixture: | | | | | | | | | |
| Xylene | 18.9 | 18.7 | 18.7 | 0 | 0 | 40.7 | 54 | 18 | 18 |
| Butyl acetate | 0 | 0 | 0 | 40.7 | 40.7 | 0 | 0 | 0 | 0 |
| Lupersol 555 | 14.5 | 14.0 | 14.0 | 30.7 | 30.7 | 30.7 | 0 | 0 | 0 |
| Vazo-67 | 0 | 0 | 0 | 0 | 0 | 0 | 24.6 | 8.2 | 8.2 |
| % Styrene (on monomers) | 15 | 5 | 10 | 5 | 5 | 5 | 0 | 0 | 10 |
| Mw | 4530 | 4264 | 3757 | 5446 | 10,505 | — | — | 4479 | 4657 |
| Mn | 1700 | 1600 | 1500 | 1900 | 2400 | 1300 | 2000 | 2300 | 1800 |
| Tg in degrees C. | 43 | 36 | 35 | 40 | 51 | 29 | 34 | 52 | 30 |

[1]t-Amyl peroxyacetate commercially available from Elf Atochem North America, Inc.
[2]2,2'-Azobis(2-methylbutyronitrile), available from E. I. DuPont de Nemours and Co.

Powder Coating Composition Examples

Each formulation in the examples below in Tables II and III are shown in amounts of parts by weight which are the grams of the actual component used in the formulation and each formulation was processed in the following manner. The components were blended in a Henschel Blender for 30 to 60 seconds. The mixtures were then extruded through a Werner & Pfleider co-rotating twin screw extruder at a temperature of 100° C. to 130° C. The extruded material was then ground and classified to a particle size of 17 to 27 microns using and ACM1 Grinder (Air Classifying Mill from Micron Powder Systems, Summit, N.J.). The finished powders were electrostatically sprayed onto test panels and evaluated for appearance and chip resistance. The results are tabulated below in Table IV.

Examples 1 through 12 show powder coating compositions of the present invention. Examples 1 to 3 show powder compositions with a variation in styrene content of the polymer while holding polymer Mw approximately constant (Example 1: 15% styrene content, 4530 Mw; Example 2: 5% styrene, 4264 Mw; Example 3: 10% styrene, 3757 Mw). Examples 2, 4 and 5 show powder compositions with a constant polymer composition (50% glycidyl methacrylate, 5% styrene, 10% butyl methacrylate, 35% methyl methacrylate) and varying Mw (Ex. 2: 4264 Mw; Ex. 4: 5446 Mw; Ex. 5: 10,505 Mw). The Mw of Example 5 is outside the scope of this invention and is considered a comparative example. Examples 6 through 10 show powder compositions made from blends of polymers having varying Mw and Tg.

TABLE II

| Ingredient | 1 | 2 | 3 | 4 | 5 | 6 | 7 | 8 | 9 | 10 |
|---|---|---|---|---|---|---|---|---|---|---|
| Polymer of Example A | 717.4 | 0 | 0 | 0 | 0 | 0 | 0 | 0 | 0 | 0 |
| Polymer of Example B | 0 | 717.4 | 0 | 0 | 0 | 538.0 | 0 | 0 | 0 | 217.4 |
| Polymer of Example C | 0 | 0 | 717.4 | 0 | 0 | 0 | 0 | 0 | 0 | 0 |
| Polymer of Example D | 0 | 0 | 0 | 717.4 | 0 | 0 | 0 | 0 | 0 | 0 |
| Polymer of Example E | 0 | 0 | 0 | 0 | 717.4 | 0 | 0 | 0 | 0 | 0 |
| Polymer of Example F | 0 | 0 | 0 | 0 | 0 | 179.3 | 226.4 | 226.0 | 208.2 | 0 |
| Polymer of Example G | 0 | 0 | 0 | 0 | 0 | 0 | 0 | 0 | 624.7 | 0 |
| PD-9060[1] | 0 | 0 | 0 | 0 | 0 | 0 | 0 | 677.8 | 0 | 0 |
| PD-3402[2] | 0 | 0 | 0 | 0 | 0 | 0 | 679.2 | 0 | 0 | 652.9 |
| VXL-1381[3] | 0 | 0 | 0 | 0 | 0 | 0 | 0 | 0 | 0 | 258.6 |
| DDDA[4] | 282.6 | 282.6 | 282.6 | 282.6 | 282.6 | 282.7 | 294.4 | 296.4 | 367.1 | 70.8 |
| EX 570[5] | 13.2 | 13.2 | 13.2 | 13.2 | 13.2 | 13.6 | 15.8 | 15.8 | 15.8 | 15.6 |
| Benzoin | 2.2 | 2.2 | 2.2 | 2.2 | 2.2 | 2.2 | 2.6 | 2.6 | 2.6 | 2.6 |
| Wax C[6] | 6.6 | 6.6 | 6.6 | 6.6 | 6.6 | 6.6 | 7.9 | 7.9 | 7.9 | 7.8 |
| PR-31[7] | 22.0 | 22.0 | 22.0 | 22.0 | 22.0 | 22.0 | 26.4 | 26.4 | 26.4 | 26.0 |
| TINUVIN 900[8] | 22.0 | 22.0 | 22.0 | 22.0 | 22.0 | 22.0 | 26.4 | 26.4 | 26.4 | 26.0 |
| GCA-1[9] | 22.0 | 22.0 | 22.0 | 22.0 | 22.0 | 22.0 | 26.4 | 26.4 | 26.4 | 26.0 |
| Methyl dicocoamine | 11.0 | 11.0 | 11.0 | 11.0 | 11.0 | 11.0 | 13.2 | 13.2 | 13.2 | 0 |

FOOTNOTES FOR TABLE II
[1]PD 9060, glycidyl containing polymer having a Tg of 44° C., commercially available from Anderson Development, Inc. made in accordance with U.S. Pat. No. 4,042,645.
[2]PD 3402, glycidyl containing polymer having a Tg of 52° C., commercially available from Anderson Development, Inc.
[3]ADDITOL VXL 1381 anhydride crosslinker commercially available from Hoechst-Celanese.
[4]Dodecanedioic Acid.

TABLE II-continued

| Ingredient | 1 | 2 | 3 | 4 | 5 | 6 | 7 | 8 | 9 | 10 |
|---|---|---|---|---|---|---|---|---|---|---|

[5]TROY EX 570, amide modified polyester oligomer commercially available from TROY Corporation.
[6]Wax C Micro Powder, a fatty acid amide (ethylene bis-stearoylamide), commercially available from Hoechst-Celanese.
[7]Sanduvor PR-31 Powder, hindered amine light stabilizer containing propanedioic acid, [(4-methoxyphenyl)-methylene]-,bis(1,2,2,6,6-pentamethyl-4-piperdivinyl)ester, commercially available from Clariant Corporation.
[8]TINUVIN 900 (2-(3',5'-bis(1-methyl-1-phenylethyl)-2'-hydroxyphenyl) benzotriazole), an ultraviolet light stabilizer available from Ciba-Geigy Corp.
[9]GCA-1, an anti-yellowing agent commercially available from Sanko Chemical Corp.

TABLE III

| Ingredient | 11 | 12 |
|---|---|---|
| Polymer of Example H | 501.5 | 334.3 |
| Polymer of Example I | 167.2 | 334.3 |
| DDDA | 246.3 | 246.3 |
| Benzoin | 7.0 | 7.0 |
| TINUVIN 144[1] | 20.0 | 20.0 |
| TINUVIN 900 | 20.0 | 20.0 |
| GCA-1 | 20.0 | 20.0 |
| Liquid Modaflow[2] | 8.0 | 8.0 |
| Methyl dicocoamine | 2.5 | 2.5 |
| Triphenyl Tin Hydroxide[3] | 7.5 | 7.5 |

[1]TINUVIN 144 (2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer available from Ciba-Geigy Corp.
[2]Modaflow, flow control additive, commercially available from Monsanto.
[3]Commercially available from Elf Atochem North America.

The clear coat compositions of Examples 1 through 12 were prepared for testing as follows. For Monochip testing, test panels coated with electrocoat primer, commercially available from PPG Industries, Inc. as ED-5000, were first primed to a film thickness of about 1.1 to 1.3 mils (28 to 33μ) with an automotive solvent-borne black primer commercially available from Mehnert & Veek, Germany, then baked for 20 minutes at 320° F. The test panels were then basecoated, by spray application to a film thickness of about 0.6 mils (15.2μ), with an oxford green waterborne base coat, commercially available from BASF, Germany. The basecoated panels were then flash baked for 10 minutes at 176° F. (80° C.) before electrostatically spray applying each powder clear coat composition of Examples 1 to 12. The powder coated panels were then cured for 30 minutes at 285° F. (140° C.). The dry film thickness (DFT) of the powder clear was targeted for 2.3 to 3.5 mils (58 to 89μ).

For appearance evaluations, each powder was electrostatically sprayed to a film thickness of 2.3 to 3.5 mils directly onto test panels coated with a smooth black electrocoat paint, commercially available from PPG Industries, Inc. as ED5051, and then cure for 30 minutes at 285° F. (140° C.). The test panels were then tested for chip resistance using the Monochip test described below, and appearance using 20° gloss, haze, and DOI as criteria. The results are tabulated in Table IV.

TABLE IV

| | MONOCHIP** | | | | Appearance Over Black | | |
|---|---|---|---|---|---|---|---|
| | Initial | | −20° C. | | ED 5051 | | |
| EXAMPLE | mm | Mode | mm | Mode | 20° Gloss* | Haze* | DOI* |
| 1 | Ac | C | VG | A | 96 | 18 | 93 |
| 2 | G | C | VG | C | 83 | 24 | 97 |
| 3 | Ac | C | VG | C | 84 | 18 | 97 |
| 4 | VG | M | M | A | 84 | 22 | 92 |
| 5 | G | M | M | A | 83 | 31 | 85 |
| 6 | M | C | VG | A | 86 | 17 | 90 |
| 7 | Ac | C | G | C | 86 | 13 | 89 |
| 8 | Ac | C | VG | A | 86 | 18 | 93 |
| 9 | M | C | VG | A | 83 | 22 | 88 |
| 10 | M | C | VG | M | 88 | 18 | 93 |
| 11 | M | C | — | — | 81 | 19 | 97 |
| 12 | M | C | — | — | 79 | 25 | 96 |

*Appearance Properties: 20° Gloss and Haze were measured by a BYK Gardner Haze - Gloss Meter. Higher numbers for gloss indicate better performance and lower numbers for Haze indicate better performance. Haze numbers over 30 are considered unacceptable. Distinction of Image (DOI) was measured by a Hunter Lab's Dorigon II where higher numbers indicate better performance.
**Monochip Test: The test panels were chipped with the use of a Byk-Gardner Mono-chip Tester. This machine uses an air driven piston to impact the test panel with a small steel mallet shaped like a screw-driver head. The pressure used was 43 psi (3 bar). Three impacts were run at ambient conditions, then the test panel was placed in a freezer at −20° C. and allowed to equilibrate. Within one minute after removing the test panel from the freezer, the panel was impacted three more times in the Byk-Gardner Mono-chip Tester. Next the panels were tape tested by covering the impact zone of the panel with Tesa 4651 tape from Beiersdorf AG, Hamburg, Germany, and then removing the tape from the test panel in one rapid pull. The "Mode" of failure or loss of adhesion of the coating after tape testing is designated "C" for cohesive failure when there is a loss of adhesion between layers of coating, "A" for adhesive failure when there is loss of adhesion to the metal substrate, and "M" for mixed adhesive and cohesive failures. A cohesive failure mode is preferred over an adhesive failure mode. The rating is the average width of paint loss from the impact areas measured in millimeters. Ac is acceptable which is generally 3.0 to 3.5 mm, M is marginal which is generally 4.0 to 5.5 mm, G is good which is generally 2.5 to 3.0 mm, and VG is very good which is generally 2.0 to 2.5 mm.

Therefore, what is claimed is:

1. A curable powder clear coating composition comprising:
   (I) from 60 to 99.99 percent by weight based on solids of the curable coating composition of at least one film-forming polymeric material, wherein the predominant film-forming polymeric material is a blend of at least two epoxy functional acrylic copolymers comprising:
      (a) a first epoxy functional acrylic copolymer having:
         A) a number average molecular weight in the range of about 1000 to 5500 grams;
         B) a calculated Tg in the range of 50° C. to 85° C.;
         C) a styrene content resulting from an amount of styrene monomer in the range of up to about 25 weight percent based on the weight percent of the monomers to form the copolymer;

D) epoxy content from 35 to 85 from glycidyl functional ethylenically unsaturated monomer, said copolymer formed by polymerizing (i) 35 to 85 percent by weight of a glycidyl functional ethylenically unsaturated monomer, and (ii) 15 to 65 percent of a copolymerizable ethylenically unsaturated monomer or mixture of monomers free of glycidyl functionality to provide an effective amount of (ii) monomers including a high Tg component monomer to yield the Tg for the copolymer, where all percents by weight are based on the weight of (i) and (ii); and (b) a second epoxy functional acrylic copolymer having:
   A) a number average molecular weight in the range of about 500 to about 3000,
   B) a calculated Tg in the range of about 35° C. to about 125° C., and
   C) an epoxy content of 90 from glycidyl functional ethylenically unsaturated monomer;

wherein each of the first and second copolymers of the blend are formed respectively by polymerizing (i) glycidyl functional ethylenically unsaturated monomer, and (ii) copolymerizable ethylenically unsaturated monomer or mixture of monomers free of glycidyl functionality and having a effective amount and type of other monomers (ii) to yield the Tg for the respective copolymer, so that for the blend of copolymers the epoxy functionality is derived from at least 35 percent by weight of (i) of the glycidyl functional ethylenically unsaturated monomer, and wherein the percent by weight is based on the weight of (i) and (ii); and wherein the blend of the first and second epoxy functional acrylic copolymers has a total styrene content in an amount up to 39 percent by weight; and (II) 10 to 40 percent by weight based on the weight of (I) and (II) of a polycarboxylic acid crosslinking agent, where the ratio of epoxy functionality for (I) to acid functionality for (II) is about 1:0.6 to 1.4.

2. The composition of claim 1 which includes a catalyst.

3. The composition of claim 2 wherein the catalyst is selected from the group consisting of organic peroxides and azo-type compounds and wherein chain transfer agents are present in the composition.

4. The composition of claim 1 which includes anti-popping agent in amounts of from 0.5 to 3.0 percent by weight based on total weight of the powder coating composition.

5. The composition of claim 1 which includes ultraviolet light stabilizers selected from the group consisting of (2-tert-butyl-2-(4-hydroxy-3,5-di-tert-butylbenzyl)[bis(methyl-2,2, 6,6,-tetramethyl-4-piperidinyl)]dipropionate) and (2-(3',5'-bis(1-methyl-1-phenylethyl)-2'-hydroxyphenyl) benzotriazole).

6. The composition of claim 1 which includes anti-yellowing agent 9,10-dihydro-9-oxa-10-phosphaphenanthrene-10-oxide, or 3,4,5,6-dibenzo-1,2-oxaphosphane-2-oxide as a white crystalline powder with a specific gravity of 1.40 at 30° C., and a melting point of 118° C. and a boiling point of about 200° C. at 5 mm Hg.

7. The composition of claim 1 which includes at least one fatty acid amide including ethylene bis-stearoylamide.

8. The composition of claim 1 wherein the first epoxy acrylic copolymer has the glycidyl functional monomer (i) copolymerized with one or more (ii) monomers having a Tg greater than 200° F. (93° C.).

9. The composition of claim 8 wherein the one or more monomers with a Tg greater than 200° F. are selected from the group consisting of (meth)acrylic acid esters having an alicyclic hydrocarbon group having 5 to 22 carbon atoms in the ester portion.

10. The composition of claim 9 wherein the (meth)acrylic acid ester are selected from the group consisting of: cyclopentyl methacrylate, cyclohexyl methacrylate, methylcyclohexylmethacrylate, trimethylcyclohexyl methacrylate, norbornylmethacrylate, norbornylmethyl methacrylate, and isobornyl methacrylate.

11. The composition of claim 1 wherein the first epoxy acrylic copolymer has the polymerization residue of an additional ethylenically unsaturated monomer selected from the group consisting of hydroxyalkylacrylates and hydroxyalkylmethacrylates including hydroxypropylacrylate, hydroxypropylmethacrylate, and hydroxybutylacrylate.

12. The composition of claim 1 wherein the amount of styrene used to prepare the first epoxy acrylic polymer is up to about 20 weight percent of the total weight of monomers used to prepare the first epoxy acrylic polymer.

13. The composition of claim 1 wherein the amounts of the (i) and (ii) monomers for the first epoxy acrylic copolymer are: (i) 35 to 65 percent by weight of the glycidyl functional monomer and (ii) 35 to 65 percent by weight of one or more copolymerized ethylenically unsaturated monomers free of glycidyl functionality.

14. The composition of claim 1 wherein the (ii) monomer is selected from the group consisting of: methylmethacrylate and trimethylcyclohexyl methacrylate.

15. The composition of claim 1 wherein in addition to the (i) and the (ii) monomer butylacrylate there is present from around 5 to around 20 percent by weight, based on weight of the total monomers for the copolymer.

16. The composition of claim 1, wherein in the blend the first epoxy acrylic copolymer has a number average molecular weight in the range of 1000 to 3000 grams, an epoxy equivalent weight in the range of 240 to 350, and a epoxy content of 50; while the second epoxy acrylic copolymer in the blend has a number average molecular weight in the range of 800 to 2000 grams, and an epoxy equivalent weight in the range of 142 to 285.

17. The composition of claim 1 wherein the polycarboxylic acid is a crystalline aliphatic polycarboxylic acid containing from 4 to 20 carbon atoms.

18. The composition of claim 17 wherein the crystalline aliphatic polycarboxylic acid is dodecanedioic acid.

19. The composition of claim 1 wherein (I) is present in an amount of 70 to 85 percent by weight and (II) is present in an amount of 15 to 30 percent by weight based on the weight of (I) and (II).

20. The composition of claim 1 wherein for (I) copolymers the copolymerizable ethylenically unsaturated monomer or mixture of monomers free of glycidyl functionality is about 25 to 40 percent by weight so that the effective amount of these monomers yields the Tg for the copolymer.

21. The composition of claim 1 which includes an acrylic flow control polymeric additive.

22. The composition of claim 21 wherein the flow control polymeric additive has a weight average molecular weight in the range from about 1000 to 40,000 and a Tg of less than 10° C.

23. The composition of claim 1, further comprising a flow control polymeric additive which is an amide modified polyester oligomer.

* * * * *

UNITED STATES PATENT AND TRADEMARK OFFICE
CERTIFICATE OF CORRECTION

PATENT NO.   : 6,277,917 B1
DATED        : August 21, 2001
INVENTOR(S)  : Jurgetz et al.

It is certified that error appears in the above-identified patent and that said Letters Patent is hereby corrected as shown below:

<u>Title page,</u>
2nd inventor, "Karen B. Allen, Irwin, PA (US)" should be -- Karen A. Barkac, Murrysville, PA --.

<u>Column 18,</u>
Line 5, "copolymerized" should be -- copolymerizable --.
Line 4, "a" should be -- an --.

Signed and Sealed this

Twenty-first Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,277,917 B1
DATED : August 21, 2001
INVENTOR(S) : Jurgetz et al.

It is certified that error appears in the above-identified patent and that said Letters Patent is hereby corrected as shown below:

Title page,
Item [73], reads:
"[73] Assignee: PPG Industries Ohio, Inc."

should read as follows:
-- PPG Industries, Inc. and Bayerische Motoren Werke Aktiengesellschaft --.

Signed and Sealed this

Twentieth Day of May, 2003

JAMES E. ROGAN
*Director of the United States Patent and Trademark Office*